Nov. 17, 1964 T. N. LOWRY 3,157,746

SUPERVISORY CIRCUIT FOR TELEPHONE SUBSCRIBER'S LINE

Filed Dec. 7, 1959

INVENTOR
T. N. LOWRY
BY S. E. Hollander
ATTORNEY

United States Patent Office 3,157,746
Patented Nov. 17, 1964

3,157,746
SUPERVISORY CIRCUIT FOR TELEPHONE SUBSCRIBER'S LINE

Terrell N. Lowry, Boonton, N.J., assignor to Bell Telephone Laboratories, Incorporated, New York, N.Y., a corporation of New York Filed Dec. 7, 1959, Ser. No. 857,608
15 Claims. (Cl. 179—18)

Figure 1:
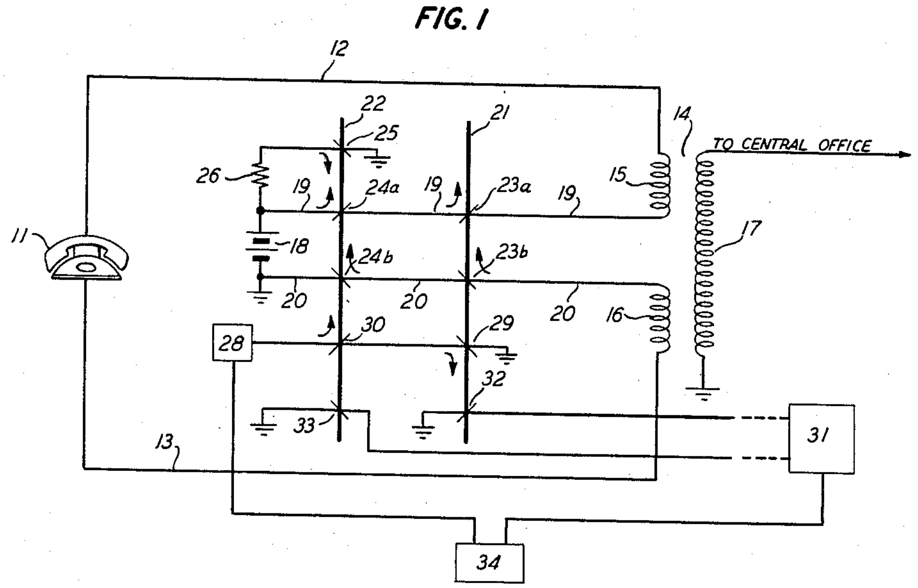

This invention pertains to supervisory circuits and more specifically to supervisory circuits utilized to determine the condition of subscriber subset loops in a telephone switching system.

It has been found advantageous in telephone switching systems to utilize remote line concentrator systems to reduce the number of trunks connecting the subscribers to a central office. Such concentrator systems include equipment positioned remote from the central office for connecting a given number of subscriber subset loops to a lesser number of trunks to a central office thereby appreciably reducing the cost of materials. In such a system the subscribers are not directly connected to a central office, and switching equipment must be provided to make the connections therebetween. The switching equipment which makes the actual physical connection between a subscriber and a trunk resides in the remote concentrator and its use is shared by all of the subscriber subset loops connected to that concentrator to further reduce duplication and expense.

The switching requirements of a remote line concentrator are determined by the type of service of which a customer is desirous, i.e., a service request and an answer require that a subscriber be connected to the central office while a hang-up requires that the subscriber be disconnected to allow use of the trunk by other subscribers. The switching required by the subscriber service needs is controlled by equipment which, upon receipt of signals descriptive of those needs, determines what connections are required therefor and influences the physical switching circuitry to make those connections. This equipment will be described hereinafter as switching control circuitry and normally resides in the central office. My invention deals with the circuitry necessary to apprise the switching control circuitry of the desires of the subscriber, the subscriber subset monitoring or supervisory equipment. Physically, since there are no direct connections between the subsets and the central office in a remote line concentrator, this equipment for monitoring or supervising the direct-current condition of a subscriber subset loop and for transferring the results of that supervision to the switching control circuitry in the central office must reside within the concentrator system.

In most telephone systems, subscriber subset loops display unique direct-current conditions for the "on-hook" and "off-hook" states. Since the direct-current condition of the subscriber loop is indicative of the on-hook or off-hook state of the subset, knowledge of this condition may be utilized to determine the switching requirements of the subsets of such a remote concentrator.

For instance, subscriber switching is required in a remote concentrator system when the direct current condition of the subset loop changes. Therefore a supervisory circuit should be capable of apprising the switching control circuitry of such condition changes in the direct-current state of the subset loop. Since switching functions are required by the various changes, however, it is desirable for the supersivosy circuitry to be able to signal the type of change which has taken place in the loop to the switching control circuitry which can then make the switching changes necessary. To this end it is desirable that a supervisory circuit provide unique output signals indicative of the individual changes-of-condition in a subset loop. If the supervisory equipment is capable of providing such unique signals, certain memory equipment necessary in the switching control circuitry to determine a change-of-condition can be eliminated thereby reducing complication and cost in the system.

To reduce duplication in a remote line concentrator, a single piece of equipment, known as scanning equipment, may be utilized to transmit the information from the supervisory circuits of the individual subset loops to the switching control circuitry. This equipment is connected to the subset loops individually in time sequence.

When supervisory equipment capable of providing change-of-condition information is utilized in remote line concentrator systems with scanning equipment, it should be capable of storing a change-of-condition signal for a period sufficient to allow the scanning equipment to interrogate all of the subset loops of the remote concentrator. Without such capability, a change-of-condition signal might be missed by the scanner. It is therefore desirable that the supervisory equipment be capable of furnishing change-of-condition outputs which persevere for at least one scanning cycle.

In addition, it is desirable that the supervisory equipment present only a single signal to the switching control circuitry indicative of any change. A plurality of such change signals for a single change in the subset loop would require the switching control to include equipment for ignoring the later ones thereof, an additionally complicating factor.

A supervisory circuit which is capable of signaling unique changes-of-condition must produce at least two output signals. An especially desirable attribute of any circuit providing two or more different output signals relates to the ability of the circuit to provide signals which are clearly distinguishable, one from the other, since equipment functioning in response thereto may be less complex. Therefore, supervisory circuits providing easily distinguishable output signals are desirable. It is also desirable where the original states or conditions measured or the changes therebetween may be easily confused that the supervisory circuit be capable of accenting any differences and furnishing clearly unique output signals indicative thereof.

In a subscriber subset loop, certain external influences tend to produce currents which may affect the measurement of the direct-current condition of the subset. For instance, fluctuating current in lines running parallel and adjacent to the wires of the subset loop creates magnetic fields which may induce currents in the subset loop to affect the measurement of the condition thereof. For example, an alternating-current coupled subset loop may comprise a subscriber subset connected to a transformer by two wires which are physically adjacent and parallel. It is advantageous to maintain the wires of a subset loop in the parallel position since magnetic fields caused by currents in other adjacent conductors then induce equal but opposed currents in each wire of the subset. These induced currents, known as longitudinal currents, advantageously cancel each other. However, though they have no effect on the subset itself, which is substantially isolated from ground, the longitudinal currents do affect the condition of the circuit in varying degrees around the loop. The changes occasioned by longitudinal currents may affect the determination of the direct-current condition or change therein in an obviously undesirable manner. The circuits provided for supervising the condition of a subset loop should, therefore, be such that longitudinal currents have no effect on the results of the determination.

A supervisory circuit used to determine the direct-current condition of a subscriber subset loop must be impervious in its determinations, not only to longitudinal disturbances in the loop, but also to the normal alternating-current signals in the loop, ringing and voice currents, for instance. Not only must the supervisory circuit be impervious to loop signals but it must create no signals of an audible frequency capable of affecting the loop adversely, by interference with voice or ringing signals.

In any telephone switching system utilized to serve a large number of customers, the cost of the various circuits included therein is of prime importance. Therefore, the number and cost of elements in any supervisory circuit adapted for use in a telephone system must be held to a minimum. Additionally, the power requirements of any supervisory circuit should be held to a minimum to reduce the operating costs of such a switching system.

In view of the foregoing it is an object of this invention to provide an improved supervisory circuit for determining the switching requirements of a subscriber subset loop.

Another object of this invention is to provide an improved supervisory circuit for determining changes in the direct-current condition of a subscriber subset loop.

A further object of this invention is to provide supervisory circuitry capable of producing a unique signal for each change-of-state in a subscriber subset loop.

Another object of this invention is to provide clearly distinguishable output signals from supervisory circuits indicative of the various conditions and changes-of-condition in subscriber subset loops.

It is another object of this invention to reduce complication in a telephone switching system by providing supervisory circuits capable of storing change-of-state signals for an indefinite period and divulging those signals upon destructive interrogation.

A further object of this invention is to render supervisory circuits substantially indifferent to longitudinal, voice, and ringing currents in the subset loop and, additionally, to provide supervisory circuits incapable of adversely affecting the subset loop.

Another object of this invention is to utilize a minimum number of elements in improved supervisory circuits used in remote line concentrators.

Briefly, the foregoing objects are accomplished in accordance with aspects of this invention by a supervisory circuit utilizing a pair of magnetic cores of a type having a substantially rectangular hysteresis characteristic. Such cores have first and second remanent states of magnetization, and, as utilized herein, are advantageously placed in one of those states by a first interrogation pulse following any change-of-condition of the subscriber subset loop to produce outputs from one or the other core for transmission to the switching control circuitry.

Specifically, each of the substantially identical cores is coupled by a split winding to the subset loop to sense the conditions and changes-of-condition therein. The split windings are advantageously on opposite sides of the subset loop to provide balancing for precluding the effect of longitudinal currents on the outputs of the magnetic cores. During the on-hook condition of the loop in which no current flows therein, a biasing winding maintains one of the cores in the extreme reset state while the other core resides in the non-biased or neutral reset state so that the cores are out of switching phase.

Interrogating pulses are applied coincidentally to both cores through oppositely wound windings thereon. The interrogation of the biased first core agrees in sense with the loop current while the interrogation of the other is opposed. At the application of interrogating pulses an output circuit is activated to receive outputs from oppositely wound output windings on the cores, an output from one of the cores indicating a service request or an answer, from the other, a hang-up.

The cores and loop windings thereon are chosen of a value such that a change-of-condition in the loop supplies a current pulse just capable of switching a core from the unbiased or neutral position in one magnetiic state to the extreme position in the other, the rateof switching being insufficient to produce an appreciable output pulse were output circuitry to be connected. The biasing current and winding are adjusted to like values. The interrogating current and windings, on the other hand, are adjusted to produce sufficient magnetomotive force to switch the cores from one neutral state to the other extreme state but insufficient to switch from one extreme state to the other, the rate being such that an appreciable output may be realized from the cores. The circuit is so arranged that a first interrogating pulse after any change-of-condition in the loop switches one of the cores to produce an output; thereafter each core is in a state such that further interrogation, until a change-of-condition in the loop, merely "shuttles" both cores and produces no output. Destructive read-out is thus provided by the circuit.

The circuit is arranged with margins such that neither voice nor ringing current in the loop are capable of switching either core. Interrogation pulses may be pulses of a substantially infinite initial slope which are therefore above audio frequency and ineffective to disturb the subscriber. The arrangement reduces power consumption by providing that the only current utilized by the circuit which would not be required for other operations is the biasing current which may be adjusted to an almost negligible value. Output signals, being from different cores, are clearly unique and easily distinguishable.

A feature of this invention relates to the use of magnetic cores having substantially rectangular hysteresis characteristics to provide supervision of subscriber subset loops.

Another feature of this invention relates to the circuit arrangement including biasing means on a single one of two cores and oppositely wound interrogating windings on both of the cores thereby providing switching only on a first interrogation after a change-of-condition in the loop and core shuttling thereafter. This arrangement assists in providing unique outputs for each change-of-condition, destructive read-out, and storage for an arbitrary period until interrogation.

Another feature of this invention relates to the use of split windings on magnetic cores connected in subscriber subsets to eliminate the effect of longitudinal currents therein.

It is an additional feature of this invention to utilize oppositely wound output windings on individual magnetic cores used in supervisory circuits to provide unique and easily discriminated output signals indicative of changes-of-condition in a subscriber subset loop.

Other features of this invention pertain to the arrangement and adjustment of the cores, currents, and windings therein so that voice and ringing currents have no effect on the measurements of the loop condition; to the use of high frequency interrogating currents which do not interfere with the audio or ringing functions of the loop; and to an arrangement providing exceedingly low power consumption.

Figure 2:
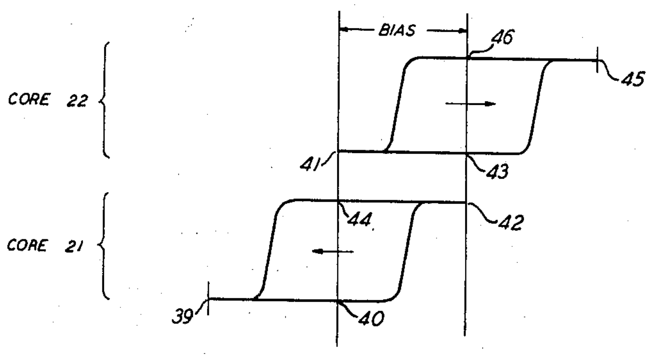

These and other objects and features of this invention will be better understood upon consideration of the following detailed description and the accompanying drawing, in which:

FIG. 1 is a schematic representation of a subscriber subset loop incorporating the present invention, displayed in mirror symbolism, for determining the direct-current changes-of-condition in that loop; and FIG. 2 is a diagram illustrative of the hysteresis diagrams of the two cores illustrated in mirror symbolism in FIG. 1.

Referring now to FIG. 1, there is shown an alternating-current coupled subscriber subset loop comprising a subscriber subset 11, of a type well known in the art. A first line 12 and a second line 13 connect the subset 11 to a transformer 14 at primary windings 15 and 16 thereof. Tie transformer 14 has a secondary winding 17 connected to remote line concentrator circuitry, not shown, advantageously adapted to provide an alternating-current path for coupling voice signals from subset 11 to a central office for utilization. Connected to the primary windings 15 and 16 of transformer 14 by a first conductor 19 and a second conductor 20 is a battery 18 utilized for providing direct-current to operate the subset 11. Ground is provided at the negative terminal of the battery 18.

In the on-hook state of the subset 11, the path connecting conductors 12 and 13 through the subset 11, is substantially an open circuit, and no current flows through the subset loop. In the off-hook state, however, the path through the subset 11 is closed, and the direct current supplied by the battery 18 will flow through the subset loop by an obvious path.

In order to measure the direct-current condition of the subset 11, or a change-in-condition thereof, to provide signals to control the connecting or disconnecting of subscribers to or from the central office, a supervisory circuit in accordance with my invention is provided. The cores of the supervisory circuit and windings thereon, hereinafter described, are illustrated in the conventional mirror symbolism described by M. Karnaugh in an article entitled, "Pulse Switching Circuits Using Magnetic Cores," Proceedings of the I.R.E., May 1955, pages 570–583. To facilitate an understanding of the direction of flux set by each current the curved arrows have been included in FIG. 1. These arrows are to be interpreted in the following manner: The normal current along a horizontal conductor in the direction of the tail of the arrow tends to set a flux in the associated core in the direction of the head of the arrow. Thus, for example, the normal current in conductor 19 in the off-hook condition is in a direction from left to right and tends to set flux in an upward direction in cores 21 and 22 or as hereinbelow described the "set" condition. In the depicting of a magnetic circuit by mirror symbolism certain paths appear to be incomplete; however, each of these paths is to be taken as a complete electrical path formed in an obvious manner.

Inserted within the subscriber subset loop coupled to the lines 19 and 20 are a first core 21 and a second core 22. The cores 21 and 22 are of a type displaying a substantially rectangular hysteresis characteristic and may take any of a number of well-known forms, the toroidal form being herein assumed for illustrative purposes only. The core 21 is coupled to the conductor 19 by a winding **23*a* and to the conductor 20 by a winding 23*b*. The windings 23*a* and 23*b* are wound in directions to provide aiding magnetomotive forces for affecting the core 21 for direct currents through the subset loop. The core 22 is likewise coupled to the conductor 19 by a winding 24*a* and to the conductor 20 by a winding 24*b*, the windings 24*a* and 24*b*** also being wound in an aiding manner.

The windings **23*a* and 23*b* and the windings 24*a* and 24*b* are wound, as mentioned supra, in directions such that loop current through these windings applies aiding magnetomotive forces to the cores 21 and 22**. It is to be noted that the *a* or *b* windings on the cores 21 and 22 may be connected in series, as shown, or to facilitate manufacture, may comprise single community windings about both cores 21 and 22. The symbolic drawing of the windings **23*a* and 24*a*, and 23*b* and 24*b*** may be illustrative of either the serial or community connections of the *a* and *b* cores. The windings **23*a* and 23*b*, and 24*a* and 24*b* are maintained in pairs of windings, each winding having the same number of turns, to provide balancing for elimination of the effect of longitudinal current in the subset loop on the cores 21 and 22; except when discussing this effect the pairs of windings will hereinafter be described as windings 23 and 24**.

Whatever quiescent condition the cores 21 and 22 are in, both windings 23 or 24 on that core 21 or 22 have equal impedances. With equal impedances the voltage drops across both windings *a* and *b* on either core are equal so that voltages due to longitudinal currents, which flow in opposite directions through the two windings *a* and *b*, are equal and opposite; and any effect thereby on the subset 11 is eliminated. Further, since equal longitudinal currents flow in opposite directions through equal windings *a* and *b* on each core 21 and 22, the magnetomotive forces applied thereto by these currents has no aggregate effect; and the effect of longitudinal currents on the output of the supervisory circuit is eliminated.

Coupled to the core 22 is a winding 25 connected by a resistor 26 to the source of biasing potential 18. The winding 25 is wound such that current therethrough is opposite in sense to loop current. Coupled to the cores 21 and 22 by a winding 29 and a winding 30, respectively, is a source of interrogating pulses 28. Interrogating current furnished by the source 28 flows in a positive sense from the source 28 to the windings 30 and 29 so that current through the winding 30 agrees in sense with loop current while current through the winding 29 is opposite in sense to loop current. A utilization circuit 31 is also coupled to the core 21 by a winding 32 and to the core 22 by a winding 33, wound in opposite senses. The utilization circuit 31 may be the switching control circuitry of the central office, not shown, or intermediate circuitry connected thereto. Connected to both the source 28 and the utilization circuit 31 for controlling the coincidental operation thereof is a scan control circuit 34.

Before describing the operation of the circuit of this invention, it is thought desirable to establish certain terminology. With reference to the cores 21 and 22, positive current from the battery 18 through the windings 23 and 24 will tend to produce flux therein in an upward sense, as viewed in the drawing. This condition of flux in either core 21 or 22, will be known hereinafter as the "set" condition while the opposite flux condition will be known as the "reset" condition. Obviously, the actual flux sense in the cores 21 and 22 is determined by the geometry of the actual cores and windings thereon, described here in symbolic form.

Referring now to FIG. 2, the hysteresis diagrams of the two magnetic cores 21 and 22 are illustrated. As mentioned supra, the cores 21 and 22 are of a type having a substantially rectangular hysteresis characteristic and, thus, first and second remanent states of mangetization.

As may be seen, the core 21, which has no biasing current applied thereto, has initial residual magnetization due to the assumed toroidal shape such that it normally resides in the center portion of the reset state illustrated by a position 40, while the core 22, which has a biasing current applied by the winding 25 initially resides in a state, due to that biasing and to its residual magnetization, as illustrated at a position 41, hereafter described as the extreme reset condition.

The various states of the cores, such as that at the position 40 and all other positions hereinafter described, illustrated in FIG. 2, may vary within certain limits. This variance may be due to ringing or voice currents, leakage, the number of subsets on a loop, and various other well-known factors. However, it is to be noted that all of these interfering factors are of values ineffective to operate either core 21 or 22 to interfere with supervision.

Assuming that the subset 11 of FIG. 1 is in the on-hook condition, there is substantially no current in the windings **23*a*, 23*b*, 24*a* and 24*b* on the cores 21 and 22; and these cores 21 and 22 remain in the states illustrated by the positions 40 and 41. If, then, an interrogating current from the source 28, the direction of magnetomotive force applied thereby being shown by the arrows within the loops, is applied to the windings 29 and 30, the current through the windings 29 and 30** produces magnetomotive forces such that during interrogation the core 21 shifts to a position 39, the extreme reset state, while the core 22 shifts to the state illustrated by a position 43, the unbiased or neutral reset state. As pointed out supra, an interrogating pulse is just sufficient to switch a magnetic core from one neutral state to the other extreme state, so that core 22 only shifts to the position 43, producing no output. Upon the termination of an interrogating pulse, the cores 21 and 22 revert to the position 40 and the position 41, respectively, shutting, and providing no output pulse since no switching is accomplished. Thus, it may be seen that in the steady-state on-hook condition no output is produced on interrogation of the cores.

Interrogation by the source 28 of a subset loop and the activation of the output equipment 31 to receive output pulses take place coincidentally as controlled by the scan control circuit 34 of the remote line concentrator.

When the subset 11 goes off-hook, providing a current path through the windings 23 and 24, the current through the windings 23 produces a magnetomotive force sufficient to switch the core 21 to the position 42. The rate of current change, however, is such that a negligible output is produced compared to that produced by interrogation, to be discussed hereinafter. The same current in the windings 24 produces a magnetomotive force which bucks that of the biasing winding 25 causing the core 22 to shift to the nonbiased position 43. Since the output circuitry 31 is operated by the scan circuit 34 to receive an output only during an interrogating pulse from the source 28, no output is realized from the switching of core 21. Additionally, the cores 21 and 22 switch during loop current changes at a rate which produces negligible output.

The core 21 and the core 22 remain in the positions 42 and 43, during all of the period while current is provided through the subset loop until an interrogating pulse from the source 28 is furnished. The interrogating current through the winding 29 is opposited to loop current so that upon receipt of an interrogating pulse, the core 21 shifts to a position 44, shuttling and providing no output pulse. The current through the winding 30, on the other hand, aids loop current so upon interrogation the core 22 switches to a position 45 to produce an output pulse at the winding 33 indicative of service request or answer, which may be utilized by the equipment 31.

When the interrogating pulse is removed, core 21 reverts to the position 42 while core 22 proceeds to a position 46. In this state further interrogating pulses only shuttle the cores 21 and 22, forcing the core 21 to the position 44 and the core 22 to the position 45, producing no output indication from either the core 21 or 22.

When the subset 11 goes on-hook and loop current is removed, the core 21 shifts to the position 44, while the core 22 slowly switches to the position 41. Since no interrogation is accomplished at this time, the slight output pulse produced from the core 22 does not operate the output equipment 31. However, a next interrogating pulse causes the core 22 to shuttle to position 43, producing no output, and the core 21 to switch to the position 39, producing an output from the winding 32 indicative of hang-up. Further interrogating pulses merely shuttle the cores 21 and 22.

Thus it is to be noted that three output indications are available; an output signal indicative of a change from on-hook to off-hook, an output signal indicative of a change from off-hook to on-hook, and an absence of signal which may be interpreted as an output indicative of a steady-state condition, either on-hook or off-hook.

The advantageous biasing arrangement of this invention wherein the cores 21 and 22 are shifted out of phase provides that individual unique output signals are produced by the cores 21 and 22 indicative of the two changes-of-condition. Additionally, the biasing arrangement and the arrangement of opposed interrogating windings on the core provides that the cores 21 and 22 are individually switched and are switched to produce output signals only by interrogating pulses. By allowing only interrogating pulses to switch the cores to produce outputs, storage of a change indication until interrogation is accomplished. Additionally, by allowing these interrogating pulses to switch the cores to produce change outputs, the cores are advantageously in a position after such a signal-producing-interrogation that they merely shuttle thereafter. Since they merely shuttle for further interrogation, destructive read-out is accomplished.

As may be seen the current through loop windings 23 and 24 is only that required to operate the subset 11. Interrogating current through windings 29 and 30 is incidental as a dissipation of power. The only power dissipated by the supervisory equipment is through the winding 25 in which current flows at all times. The resistor 26 is of a value and the winding 25 wound in a manner that very little current is used for biasing thus reducing power loss to a negligible amount. Though shown connected to the battery 18, the winding 25 may be connected to any other available direct-current source.

Of especial note in the circuit of this invention is the lack of a shunting capacitor between the windings 15 and 16 of the transformer 14 for by-passing the feed battery circuit. Since there are no impedances separating the subset 11 and the battery 18 except the transformer 14 and the windings 23 and 24, the by-passing capacitor may be eliminated if, as in this invention, the cores 21 and 22 are chosen of values providing negligible impedance to audio frequency currents. If the cores 21 and 22 are so chosen substantially all of the voice and ringing voltages appear across the transformer 14 and the necessity for a shunting capacitor is eliminated.

The circuit of FIG. 1 is of a type which is easily adapted to modern compact systems. For example, the interrogation and scanning of one hundred such supervisory circuits may be carried out by a ten-by-ten selecting matrix if the windings 29 and 30 are divided into equal split windings each having half the present number of turns. Thus the scanning equipment need not incorporate individual switches operative to select each individual supervisory circuit in turn. The cores 21 and 22 take up the majority of physical space in such a circuit and, as is well known, may be made in very small sizes. The simplicity of a supervisory circuit utilizing only two cores and the windings thereon is especially to be noted.

It is to be understood that the above-described arrangements are illustrative of the applications and the principles of this invention. Numerous other arrangements may be devised by those skilled in the art without departing from the spirit and scope of the invention.

What is claimed is:

1. A supervisory circuit for determining changes-of-condition in a subscriber subset loop comprising first and second substantially identical magnetic cores displaying a substantially rectangular hysteresis characteristic, each of said cores having set and reset states of remanent magnetization and saturation states, current biasing means coupled to said first core for normally maintaining said first core in a reset saturation state, said second core being normally in said remanent reset state, means coupling each of said cores to said subset loop for enabling direct current in said loop to maintain said second core in a set saturation state and said first core in one of said states of remanent magnetization, an interrogating means coupled to each of said cores for switching said first core from said remanent reset state to said remanent set state when direct current flows in said subset loop and for switching said second core from said remanent set state to said remanent reset state in the absence of direct current in said subset loop, and utilization means coupled to each of said cores for detecting changes in flux direction in said cores.

2. A circuit as in claim 1 wherein said means coupling each of said cores to said subset loop comprises balanced means connected to said loop on opposite sides thereof.

3. A circuit as in claim 1 wherein said means coupling each of said cores to said subset loop and said biasing means each produces a magnetomotive force just sufficient to switch said cores from one of said remanent states to saturation in the other of said states; and said interrogating means applies magnetomotive forces to said cores sufficient to switch said cores from one of said remanent states to saturation in the other of said states but insufficient to switch said cores from saturation in one of said states to saturation in the other of said states.

4. A supervisory circuit for use with a subscriber subset loop comprising first and second cores displaying a substantially rectangular hysteresis characteristic, means coupling direct current in said subset loop to said first and second cores, current means coupled only to said first core, signaling means oppositely coupled to said first and said second cores, and output means coupled to said first and said second cores for detecting changes in flux direction in said cores.

5. A supervisory circuit as in claim 4 wherein said means coupling said direct current to said first and second cores and said current means each includes means for placing said cores in a first state of remanent magnetization while said signaling means includes means for placing said first core in said first state and said second core in a second state of remanent magnetization.

6. A supervisory circuit as in claim 5 including means oppositely coupling each of said cores to said output means.

7. A supervisory circuit as in claim 6 including means for operating said signaling means and said output means coincidentally.

8. A circuit for determining changes-of-condition in a telephone subscriber subset loop comprising first and second substantially identical magnetic cores, each having set and reset states of remanent magnetization, a source of interrogation pulses, biasing means including a biasing winding on said first core for resetting said first core, a loop winding on each of said cores connected in said subset loop, said loop winding on said second core for enabling direct current in said loop to set said second core, an interrogation winding on each of said cores connected to said interrogation source for enabling interrogation pulses from said source to set said first core when said direct current flows in said loop and to reset said second core in the absence of said direct current in said loop, and output means including an output winding on each of said cores for detecting changes in the flux direction in said cores.

9. A circuit as in claim 8 wherein said loop windings and said interrogation winding on said first core and said output winding on said second core are wound in a first direction on said cores, and all others of said windings are wound in a second direction on said cores.

10. A circuit as in claim 8 wherein said source of interrogation pulses comprises means for furnishing pulses of frequencies higher than audio frequencies, and including means for operating said source of interrogation pulses and said utilization means coincidentally.

11. A circuit as in claim 8 wherein said loop winding on each of said cores comprises a community winding encircling both of said cores.

12. A circuit as in claim 8 wherein said loop winding on each of said cores comprises a first winding on said first core and a second winding on said second core, said first and second windings being serially connected in said subset loop.

13. A circuit as in claim 12 wherein said first and second windings each includes first and second equal sections connected on opposite sides of said subset loop; wherein said first sections of said first and second windings, said interrogation winding on said first core, and said output winding on said second core are wound in a first direction on said cores; and wherein said second sections of said first and second windings and all others of said windings are wound in a second direction on said cores.

14. A circuit as in claim 13 wherein said source of interrogation pulses includes means for furnishing pulses of frequencies higher than audio frequencies.

15. A circuit as in claim 14 wherein said biasing means includes a battery in said subset loop for energizing the subset therein.

References Cited in the file of this patent

UNITED STATES PATENTS

| | | |
|---|---|---|
| 2,715,658 | Dunlap et al. | Aug. 16, 1955 |
| 2,813,260 | Kaplan | Nov. 12, 1957 |
| 2,904,636 | McKim et al. | Sept. 15, 1959 |
| 2,917,639 | Schubert | Dec. 15, 1959 |
| 2,925,473 | Lucas | Feb. 16, 1960 |
| 2,952,742 | Zenichi Kiyasu et al. | Sept. 13, 1960 |